United States Patent [19]

Williams

[11] 4,123,354
[45] Oct. 31, 1978

[54] METHOD OF REMOVING OIL FROM WATER

[75] Inventor: Robert E. Williams, Houston, Tex.

[73] Assignee: Exxon Production Research Company, Houston, Tex.

[21] Appl. No.: 849,158

[22] Filed: Nov. 7, 1977

[51] Int. Cl.$^2$ .................. B01D 15/00; B01D 33/14
[52] U.S. Cl. .................. 210/40; 210/242 AS
[58] Field of Search ........... 210/23, 242, 400, 401, 210/40, 391, 396

[56] References Cited

U.S. PATENT DOCUMENTS

| 1,604,402 | 10/1926 | Fleischer | 210/40 |
| 2,866,827 | 12/1958 | Jurgeleit et al. | 210/DIG. 25 X |
| 3,138,088 | 6/1964 | Foth | 210/400 |
| 3,190,451 | 6/1965 | Holland | 210/401 |
| 3,477,583 | 11/1969 | Krynski et al. | 210/401 |
| 3,490,596 | 1/1970 | Fernandez | 210/400 |
| 3,508,663 | 4/1970 | Brill | 210/396 |
| 3,608,727 | 9/1971 | Grutsch | 210/391 |
| 3,767,052 | 10/1973 | Shibasaki | 210/400 |
| 3,850,804 | 11/1974 | Taylor et al. | 210/400 |
| 4,065,386 | 12/1977 | McGrew | 210/391 |

Primary Examiner—Charles N. Hart
Assistant Examiner—E. Rollins Cross
Attorney, Agent, or Firm—Salvatore J. Casamassima

[57] ABSTRACT

Suspended droplets of oil are removed from a waste water stream by the method of the present invention. The oil and water mixture is injected into a partially submerged, vertical pipe and is contacted by an endless oleophilic, fibrous cord which is drawn through the pipe and which selectively removes the oil droplets from the waste water. Preferably, the fibrous cord is drawn upwardly through the pipe in a direction counter-current to the flow of the waste water. Oil which coalesces on the fibrous cord is squeezed from the cord at the surface while clarified waste water is discharged from the lower end of the pipe. If used to clarify waste water from an offshore rig the pipe is vertically positioned adjacent the rig.

6 Claims, 2 Drawing Figures

METHOD OF REMOVING OIL FROM WATER

BACKGROUND OF THE INVENTION

1. Field of the Invention

This invention relates to the separation of oil-water mixtures. In one aspect, it relates to a method for use in offshore operations whereby oil and water mixtures produced from an offshore well can be separated to permit the discharge of water into the sea.

2. Description of the Prior Art

Most oil and gas wells produce a certain amount of water or brine in conjunction with oil and gas. A major problem faced in offshore oil operations is the economic separation of such oil, gas and water mixtures so that the water can be removed from the hydrocarbons and discharged back into the sea. The separated water returned to the sea must have a quality that complies with environmental discharge laws and regulations. For example, recent guidelines issued by the Federal Environmental Protection Agency requires that water discharged into the Gulf of Mexico may contain no more than 72 parts per million of oil. Conventional separation devices such as heater treaters normally discharge an aqueous effluent that typically contains 200 to 300 parts per million of oil and frequently as much as 1000 parts per million.

Numerous methods and apparatus have been employed by the offshore petroleum industry to reduce the oil concentration in produced water to environmentally acceptable limits. One approach has been to use fibrous media coalescers and collectors. Such devices utilize cords, mops or filter elements which contain oleophilic or petrophilic fibers. The primary function of these fibrous elements is to selectively coalesce droplets of oil while rejecting water so that the droplets can be more readily adsorbed and collected.

Fibrous media coalescers use a stationary oleophilic filter element to attract oil particles from the oil and water mixture. (See, for example, U.S. Pat. Nos. 3,668,118 and 3,794,583.) Although coalescers are effective in substantially reducing oil content in an effluent stream, they have a tendency to get saturated with oil or plugged with suspended solids. As a result, frequent cleansing or replacement of the filter element may be necessary. Suspended solids and fines are especially a problem since the build-up of solids on the fibers causes their performance to rapidly deteriorate.

One approach to solving the problem of oil saturation and solids build-up is to continually expose the oily effluent to relatively clean oleophilic fibers. A device which employs such a technique is the socalled "Oil Mop" (a tradename of Oil Mop, Inc.). The oil mop, which is disclosed in U.S. Pat. Nos. 3,748,682 and 3,774,685, employs an endless loop of an oleophilic, fibrous cord that is drawn through a pool of water having a floating layer of oil. As the cord pulls through the water it contacts the oil layer and sorbs it. The oil-laden cord is then brought to the surface where it is sent through a wringer or squeezed to remove the oil and suspended solids from the cord. The cleansed cord is returned to the water to collect more oil. The endless, oleophilic cord is effective in collecting oil but has the disadvantage of having a contact area limited by the size of the cord. Therefore, it can only be used effectively when the oil can be concentrated in a layer floating on top of the water. If the oil is finely dispersed throughout the oil in fine droplets, as is the case with most waste water streams from an offshore rig, then the oleophilic cord, as it is currently used, will be unable to achieve any further significant clarification of the water.

SUMMARY OF THE INVENTION

The present invention solves the problems unresolved by the prior art by providing a system for effectively separating oil and water mixtures so as to permit the discharge of environmentally acceptable waste water. In accordance with the method of the present invention, an oil bearing waste water stream is injected into a partially submerged vertical pipe. Passing through the pipe in contact with the waste water stream is an oleophilic fibrous cord which selectively sorbs oil droplets suspended in the water. It is highly preferred that the fibrous cord be drawn upwardly through the pipe in a direction countercurrent to the flow of the waste water. The overall diameter of the fibrous cord should be approximately equal to the inside diameter of the pipe through which it passes. Clarified waste water, substantially free of oil contaminants is discharged through the bottom, open end of the pipe. The present invention is especially suited for clarification of waste water streams produced from offshore rigs.

Operations are maintained continuous by removing oil collected by the fibrous cord at the surface and returning the cord to the lower end of the cleaning pipe for renewed contact with the waste water stream. Oil is removed from the fibrous cord by passing it through counter rotating rollers which compress the cord and squeeze the sorbed oil from it.

In the preferred method of the present invention, a u-shaped pipe is employed through which the fibrous cord is looped. Waste water is injected into the tubular section of the u-shaped pipe through which the cord upwardly passes. After being cleansed of oil, the fibrous cord is returned to the other tubular section of the u-pipe thereby isolating the cord from the surrounding sea water during the cord's return passage through the pipe. Both tubular sections of the u-shaped pipe are in communication to permit an endless loop of the fibrous cord to continuously pass through the pipe.

Countercurrent contact of the oleophilic, fibrous cord with the waste water stream within a relatively narrow pipe greatly increases the efficiency of the cord in coalescing the oil droplets suspended in the waste water stream. The improved oil separating efficiency provided by the method of the present invention enables significantly higher flow rates of oil bearing waste water to be clarified than was heretofore possible.

DESCRIPTION OF THE PREFERRED EMBODIMENT

Figure 1:
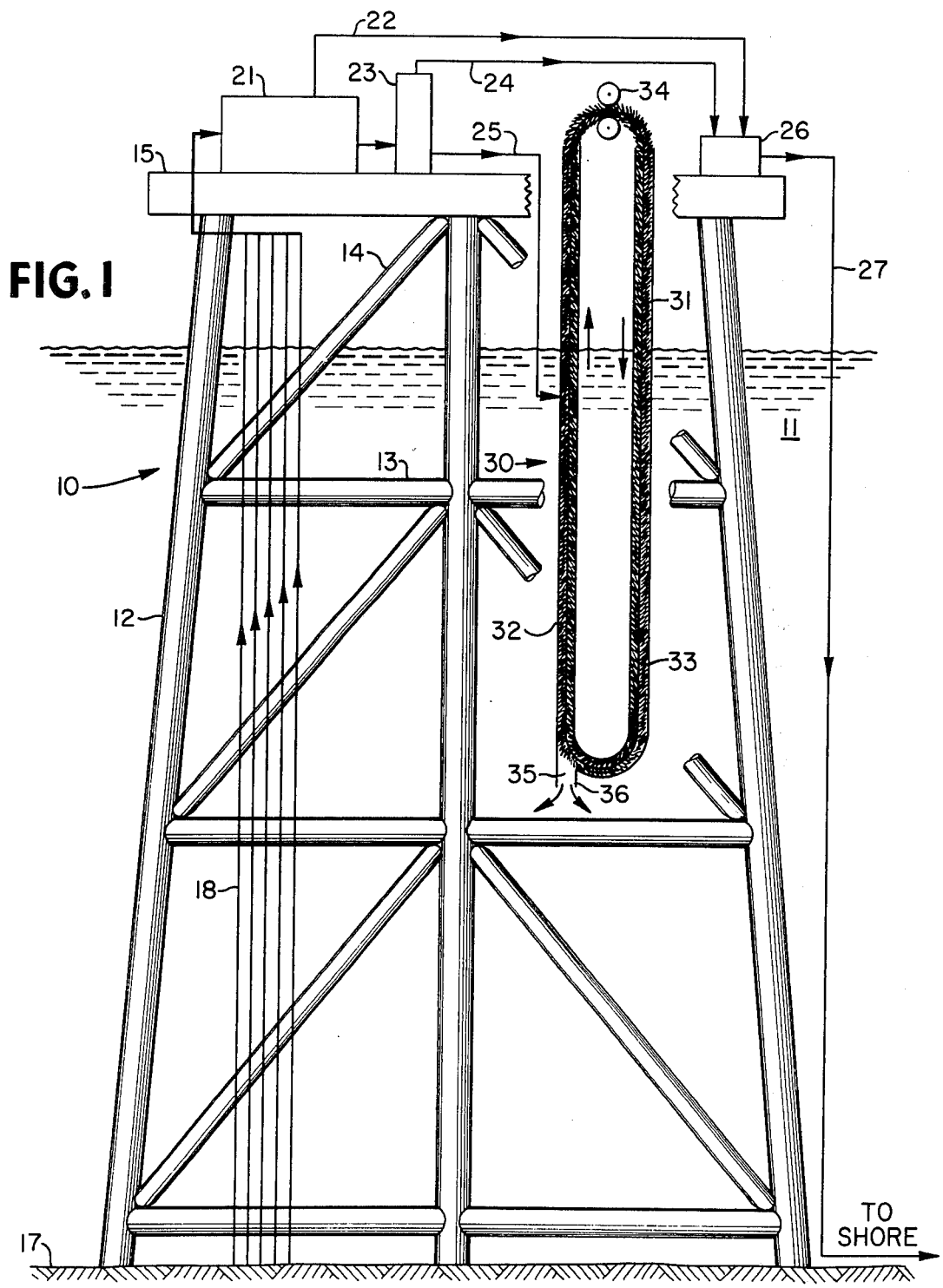
FIG. 1 is a schematic elevational view, party in section, showing an offshore production platform including the separation system of the present invention.

FIG. 1 shows an offshore platform 10 located in a body of water 11. Platform 10 is a fixed, bottom supported structure typical of those used for offshore drilling and production and is fabricated from a plurality of welded members including legs 12, cross braces 13 and diagonal braces 14. The structural members provide the platform with the strength necessary to support platform deck 15 and withstand the wind, waves and sea currents encountered in an offshore environment.

As depicted in FIG. 1, platform 10 is a production platform capable of treating and storing fluids produced from a nearby offshore field. Rising from sea floor 17 are a plurality of well conductors 18 which transport oil and gas produced from several well sites located within the offshore field. Thus, platform 10 serves as a centralized collection and processing facility for the field.

Since fluids produced from oil fields frequently contain significant quantities of water, in addition to oil and gas, the production facility must be equipped to segregate the oil, gas and water mixtures into their constituents. Platform deck 15 is shown in the drawing equipped with the apparatus necessary to effect a substantial, primary separation of the produced fluids. Fluids from well conductors 18 flow into gas separator 21 which separates the produced fluids into their liquid and gaseous components. Separator 21 is essentially a low pressure settling tank which permits the lighter hydrocarbon components, primarily methane, to flash off and be withdrawn through gas line 22.

Liquid components from separator 21 enter treater 23 which separates the liquids into an oil stream 24 and a waste water stream 25. Treater 23 is typically a heater-treater which simultaneously heats and separates the oil and waste water mixture. The application of heat to the liquid stream assists in destabilizing the oil-water mixture which may be in the form of an emulsion. Demulsifying agents can also be added at this point to help break any oil-water emulsion which may have formed as a result of excessive mixing of the oil and water components. The separation unit of the treater may consist of a combination of weirs, coalescers, baffles and skimmers which serve to gravitationally separate the oil-water mixture and coalesce the oil. Once separated, oil from stream 24 and gas from line 22 are fed by pump 26 into pipeline 27 through which the oil and gas are transported to onshore processing facilities. Normally, treater 23 can substantially separate the oil-water mixture. However, such separation equipment, at best, will typically discharge a waste water stream which contains anywhere from 200 to 1000 parts per million of oil. Since the waste water effluent from an offshore rig must ultimately be discharged into the sea, the oil content of the effluent has to be reduced even further to satisfy environmental regulations.

The method of the present invention provides the necessary secondary treatment to reduce the oil content of waste water stream 25 to an environmentally acceptable level and to maximize the recovery of oil from the offshore field. As shown in FIG. 1, a pipe 30 in the shape of a u-tube is vertically positioned adjacent platform 10 and extends from a position slightly above the surface of the sea to a position substantially below the surface. Drawn through pipe 30 is an endless, oleophilic, fibrous cord 31. In the preferred embodiment of this invention, cord 31 is rotated so that it upwardly passes through tubular cleaning section 32 of pipe 30 and downwardly passes through tubular return section 33. Sections 32 and 33 are in communication to permit continuous passage of the cord.

Pipe 30 should be made of high strength materials such as steel or concrete. The pipe should also be securely attached to or supported by platform 10 so that it remains in a stable position under the influence of strong wind and wave action. For example, the pipe can be bolted or welded to legs 12 and braces 13 and 14 to provide it with the necessary structural support.

Under the method of the present invention, waste water stream 25 containing suspended droplets of oil is injected into the upper portion of section 31 of pipe 30. The waste water cascades downwardly through the pipe and countercurrently contacts fibrous cord 31 which is moving in the opposite direction. As will be explained in more detail later, cord 31 selectively sorbs oil from the waste water and carries the oil to the surface. At the surface, cord 31 is passed through counter rotating rollers 34 which squeeze the cord to express oil which has coalesced on and has been collected by the cord. By the time the waste water reaches the bottom of pipe 30 it is substantially free of contaminating oil and should contain no more than about 10 to 20 ppm of oil. During steady state operations, clarified waste water 35 is continuously discharged from the lower end of pipe 30 through port 36 into the sea. This water having been cleansed by the method of the present invention, is substantially free of contaminating oil and should contain no more than about 10 to 20 ppm of oil.

After cord 31 is cleansed of oil by rollers 34 it is returned through section 33 of pipe 31. Section 33 is filled with sea water which permits the cord to be restored to its original shape before it recontacts the waste water in section 32. Section 33 also permits cord 31 to be isolated from the surrounding body of water 11 so that any residual oil remaining on the returning cord will not contact and thus pollute the external sea water.

Figure 2:
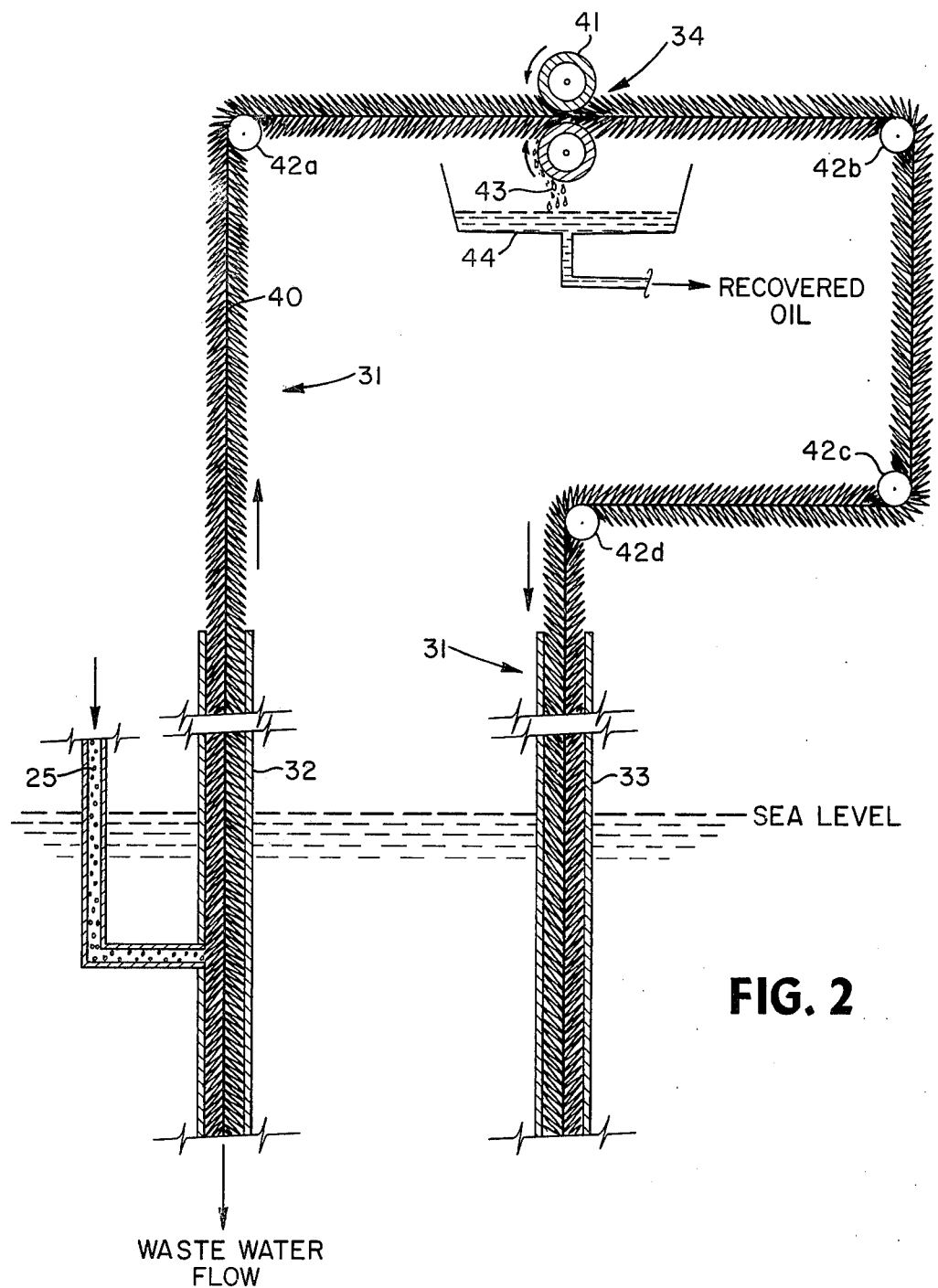
FIG. 2 is an enlarged elevational view, partly in section, which illustrates the separation system of the present invention.

FIG. 2 schematically depicts in more detail the oil separation system of the present invention. As cord 31 is drawn upwardly through pipe section 32 it comes into countercurrent contact with oil-bearing waste water stream 25 which feeds into the pipe. Since pipe 31 is open to the sea (as shown in FIG. 1) the level of waste water within pipe sections 32 and 33 will hydrostatically equilibrate at or near sea level.

Cord 31 contains many millions of fibers or bristles, indicated by numeral 40, which are made from an oleophilic material such as fibrillated polypropylene, polyethylene, nylon, polyvinyl chloride or similar organic polymers. The oleophilic material selectively coalesces the droplets of oil suspended in waste water stream 25 on contact while rejecting the water. Water-wet or hydrophilic solids such as sand and clay particulates will remain in the water stream and will be discharged into the sea. However, such oil-free solids are generally considered environmentally acceptable for discharge into the sea. Oil-wet or oleophilic solids such as iron sulfide and certain other minerals will coalesce with the oil on the fibers of the cord, and will adhere to the fibers, and be removed by rollers 34.

Moving the endless cord through pipe 31 are the counter rotating rollers 34 which simultaneously pull and squeeze cord 31. Rollers 34 are shown surfaced with squeegee rolls 41 which effectively compress the cord without damaging it. Rolls 41 may be made of rubber or other types of pliant, high strength, polymeric materials such as polyurethane. Guiding cord 31 through rollers 34 and pipe 30 are idler sheaves 42a, 42b, 42c and 42d. The system of sheaves serves to maintain tension on the cord and to train its direction. Rotational motion may be applied to the sheaves to assist rollers 34 in pulling the cord. Although a particular sheave and roller system is shown in FIG. 2, it should be appreciated that numerous roller, sheave and pulley systems can be devised to draw the fibrous cord in practicing the method of the present invention. An example of such an alternate design is shown in U.S. Pat. No. 3,774,685 (Rhodes).

As cord 31 is pulled through rollers 34, oil and oil-wet solids that have coalesced on fibers 40 are expressed from the cord. Oil dripping from the wrung cord, indicated by numeral 43, collects in pan 44 and is siphoned off. The recovered oil can be combined with the other oil produced by the offshore wells, thus enhancing overall recovery. Cord 31, having been cleansed of oil, passes over sheaves 42b, 42c and 42d and is returned to pipe section 33. In this manner the fibrous cord can continuously operate to produce an effluent with a very low oil content. Since the cord is being cleaned as it operates, it cannot become clogged by mineral solids, viscous oils, waxy residues or tarry particles, i.e., materials which are normally troublesome in stationary plate or fibrous media coalescers.

A major advantage of the present invention is that the countercurrent contact of waste water and fibrous cord significantly increases the surface area available for oil coalescence. All suspended oil droplets get ample opportunity to contact, and coalesce with an oleophilic surface which effectively removes the droplets from the water stream. Thus the fibrous cord, rather than merely dipping into a pool of waste water, is instead exposed to the entire stream of waste water that is produced. Referring back to FIG. 1, it can be seen that pipe 30 extends a substantial distance below the surface. Pipe section 32 may be more than 100 feet in length and as much as 3 feet or more in diameter. The transit time for fibrous cord 31 to traverse the entire loop through pipe 30 may be regulated from a few minutes to several hours depending on the concentration of contaminants and the degree of clean-up desired. The combination of countercurrent contact and high residence time results in a significantly higher coalescence efficiency than has been otherwise previously obtainable.

The present invention is further described by the following example which is illustrative of a hypothetical mode of practice:

A wastewater clarification system is to be designed for an offshore field producing 20,000 barrels of fluids per day. Of the 20,000 bpd output it is estimated that 10% or 2,000 bpd is saline water, the rest being crude oil. The produced fluids will be collected at an offshore production platform where they will undergo initial separation by a heater-treater. The heater-treater will generally heat the oil-water mixture to a temperature of about 150° F. If a stubborn emulsion is produced from the field, the addition of pH modifiers such as sulfuric acid or caustic soda or the addition of demulsifying agents will normally break the emulsion to permit substantial separation of the oil and water. It is anticipated that the waste water stream leaving the heater-treater will contain about 1000 ppm of oil. Although this only represents about 2 barrels of oil per day, the waste oil stream must undergo further treatment to reduce the oil content to under 70 ppm.

For a given waste water flow rate, the diameter of the u-shaped pipe used in the method of the present invention can be calculated readily by the equation:

$$V_w = (0.00284 \, Q_w/d^2)$$

where
$V_w$ = flow velocity of waste water (fps)
$Q_w$ = volumetric flow of waste water (gpm)
$d$ = diameter of pipe in feet Based on the waste water flow rate of 2000 barrels per day or 58 gallons per minute and a desired flow velocity in the pipe of 0.1 feet per second, the diameter of the pipe is computed to be 1.29 feet.

If a pipe 100 feet in length is utilized, the residence time of the waste water in the pipe will be almost 17 minutes. The fibrous, oleophilic cord moving countercurrently against the flow of the water can be drawn through the pipe at an equally slow rate of speed, thereby permitting thorough contact of the fibrous elements of the cord with the waste water stream. The effluent stream being discharged into the sea from the lower end of the pipe should contain no more than about 10 ppm of oil.

It should be apparent from the foregoing that the method of the present invention offers significant advantages over oil-water separation equipment known to the art. It will be appreciated that while the present invention has been primarily described with regard to the foregoing embodiments, it should be understood that several variations and modifications may be made in the embodiments described herein without departing from the broad inventive concept disclosed herein.

I claim:

1. A method of removing oil from a mixture of oil and water produced on an offshore rig comprising:
    injecting said oil and water mixture downwardly into a partially submerged vertical pipe adjacent said rig;
    upwardly passing through said pipe an endless oleophilic fibrous cord to countercurrently contact said oil and water mixture and selectively absorb oil from said mixture, said fibrous cord having sufficient residence time within said pipe to substantially reduce the oil content of said oil and water mixture; and
    removing the oil collected by said fibrous cord at the surface and returning said cord to the lower end of said pipe for renewed contact with said oil and water mixture.

2. The method of claim 1 wherein clarified waste water is discharged from the bottom of said pipe.

3. The method of claim 1 wherein said fibrous cord is returned to said cord through a return tube which is in communication with said pipe.

4. The method of claim 1 wherein oil is removed from said fibrous cord by passing said cord through roller means which squeeze oil from said cord.

5. A method of removing oil from a mixture of oil and water produced on an offshore rig comprising:
    injecting said oil and water mixture downwardly into a first tube of a u-shaped pipe, said pipe being partially submerged in a vertical position adjacent said rig;
    upwardly passing through said first tube an endless, olephilic fibrous cord which countercurrently contacts said oil and water mixture, thereby selectively absorbing oil from said mixture, said fibrous cord having sufficient residence time within said pipe to substantially reduce the oil content of said oil and water mixture;
    removing the oil gathered by said cord at the surface by passing said cord between rollers which squeeze the oil from said cord;
    returning said cord downwardly through a second tube of said u-shaped pipe which is in communication with said first tube, said cord ultimately passing into said first tube for renewed contact with said oil and waste water; and discharging clarified waste water through an opening at the bottom of said u-shaped pipe.

6. The method of claim 5 werein said fibrous cord has an overall diameter approximately equal to the inside diameter of said tube.

* * * * *